United States Patent [19]

Azzolini

[11] 4,351,211
[45] Sep. 28, 1982

[54] METHOD AND APPARATUS FOR CUTTING BLANKS FROM FOAM MATERIAL

[75] Inventor: Georges P. Azzolini, Juziers, France

[73] Assignee: Sovra S.A., Juziers, France

[21] Appl. No.: 196,522

[22] Filed: Oct. 14, 1980

[30] Foreign Application Priority Data

Mar. 25, 1980 [FR] France ............................... 80 06914

[51] Int. Cl.³ .............................................. B26D 7/08
[52] U.S. Cl. ......................................... 83/861; 83/21;
83/176
[58] Field of Search ............................ 83/861, 17–21,
83/176

[56] References Cited

U.S. PATENT DOCUMENTS

| 1,145,654 | 7/1915 | Anderson | 83/176 X |
| 1,204,922 | 11/1916 | Wilms | 83/176 X |
| 2,404,731 | 7/1946 | Johnson | 12/146 |
| 3,665,792 | 5/1972 | Bush et al. | 83/1 |
| 3,695,128 | 10/1972 | Gentile | 83/1 |
| 3,730,031 | 5/1973 | Huttermann | 83/4 |

FOREIGN PATENT DOCUMENTS 1160580 7/1958 France .
1225078 6/1960 France .

Primary Examiner—Frank T. Yost
Attorney, Agent, or Firm—Schwartz, Jeffery, Schwaab, Mack, Blumenthal & Koch

[57] ABSTRACT

A method and device for cutting out pieces of the desired shape having a cavity with a bottom wall at different levels from a block of plastic foam material. The block of foam material is compressed between a first plate having a relief form member corresponding in shape to the desired cavity and a die having an aperture of the desired contour. The part of the compressed block protruding through the aperture is compressed by the back form member corresponding to the different levels of the cavity and provided on a second plate on the other side of the die remote from the first plate. A straight edge cutting blade cuts the block flush with the die between the die and the second plate to obtain the piece of desired shape.

12 Claims, 8 Drawing Figures

METHOD AND APPARATUS FOR CUTTING BLANKS FROM FOAM MATERIAL

FIELD OF THE INVENTION

The present invention relates to a novel technique of cutting blanks with tridimensional surfaces from foam material, e.g. of polyether, polyester or polyurethane.

BACKGROUND OF THE INVENTION

It is known that such materials are increasingly used in particular for making packing members for fragile objects or objects of complicated configuration and in the furniture industry (seats for interior use and theaters), automobile seats and accessories, toys, safety equipment and decoration, and the like.

When used as packing members these elements comprise a hollow cutout the contour of which has tended to become more and more complicated to intimately mate with the objects or parts to protect them and for increasingly varied uses.

In general to make such foam plastic pieces the well-known technique of cutting a precompressed block of foam with a saw blade is used.

The general principle of such a cutting operation has been well-known for rather a long time. It comprises the compression of the block of foam between a plate and a rigid die comprised of a rigid plate with an appropriate aperture through which swells part of the mass of the block of compressed foam.

A form block is exerted against the block of foam between the latter and a pressor plate substantially corresponding in relief to the hollow cutout to be produced in the block of foam.

The part of the block of foam which protrudes beyond the cutout in the die is then cut at the level of the die with a cutting tool such as a saw blade. After relieving the pressure on the block of foam there is in the block in line with the die a hollow corresponding to the configuration of the relief portion.

By giving the form various configurations different cutouts, curves and depths may thus be produced in blocks of foam.

Different variations of the same technique have been proposed in the past with a view to overcoming certain specific problems.

Thus in order to obtain hollow cutouts of constant and accurate depth, it has been proposed to compress the block of foam between a plane presser plate and a die of suitable aperture, the part of the block of foam protruding beyond the die itself being compressed between the die and a lower presser plate which is likewise plane and parallel to the plane of the die.

It has also been proposed to displace a block of foam between two presser rolls, a die or form being interposed between one of the cylinders and the block of foam while a saw blade cuts a layer of foam of variable thickness depending on the amount of compression of the block of form when it encounters the cutting blade.

These various devices are, however, limited in their application and do not permit the obtention of hollow cutouts with sharp vertical walls connected by sharp angles, right angles or acute angles, with the bottom wall and particularly do not enable cutting hollow cutouts with protruding or projecting portions on the bottom wall, similar to high points of a seabed, of various contours.

SUMMARY OF THE INVENTION

An object of the invention is to provide a novel technique for cutting into the desired configuration pieces of plastic foam material so as to obtain complex hollow contours of great varieties comprising in particular concave and convex portions located at different levels in relation to the plane of the open end of the cutout.

According to the invention, there is provided a method for cutting out pieces of plastic foam material into the desired shape, comprising the steps of compressing a block of foam material between a plate and a die of suitable contour, cutting the part of the block of foam material protruding through an aperture in the die. The method is characterized by interposing between the plate and block of foam material a relief form member generally mating with the cavity to be formed in the block of foam material, applying against the part of the block of foam material protruding from the aperture in the die with predetermined adjustable pressure a back plate having a back relief form member the different levels of which correspond to the different levels of the bottom wall of the ultimate cavity, then displacing a cutting blade relative to the die between the die and the back form member through the compressed protruding part of the foam block, then relieving the pressure exerted on the block of foam material to separate and remove the resulting pieces of the block of foam material.

Accordingly, there is obtained in the block of foam material one or more cavities which may be of great variety of different shapes and may have bottom wall and side wall surface with relief or hollow portions, plateaus, inclined connecting planes or sectors and sharp angles between the bottom wall and the side walls at right angles or even acute angles.

The possibilities of use of such cutout block of foam material in particular for protection or packing are greatly increased owing to the ease with which even very complicated shapes may be obtained capable of intimately mating with a very large number of objects of all kinds including parts of the human body such as the face as will be illustrated below in the detailed description.

According to the present invention, there is also provided a device for carrying out the method according to the invention. The device comprises a plane rigid die having at least one aperture of appropriate contour, a first plate disposed above the die, means for displacing the first plate towards the die for compressing a block of foam material introduced between the first plate and the die, a second plate disposed below the die, means for displacing the second plate towards the die to compress the part of block of foam material protruding through the aperture in the die and a cutting blade movable relative to the die between the die and the second plate. The device is characterized by further comprising a relief and/or hollow form member suitable for the configuration of the cavity to be cut out and mounted on the side of the first plate facing the die and an opposed back relief and/or hollow form member mounted on the side of the second plate facing the die.

The device according to the invention notable by reason of its simplicity especially since the form member and the back form member may be easily and quickly made of wood, for example, with approximate contours without detriment to the accuracy and estetic quality of the shape of the resulting cavity which surprisingly permits all such form members and back form members to be made, adapted and refined with a view to producing quickly and at low cost cavities of any configuration whatsoever even complex configurations adapted to intimately mate with the article to accomodate or protect.

Other features and advantages will be brought out in the description which follows of an embodiment of the device, given merely by way of example and with reference to the accompanying drawings.

DETAILED DESCRIPTION OF THE PREFERRED EMBODIMENT

Figure 1:
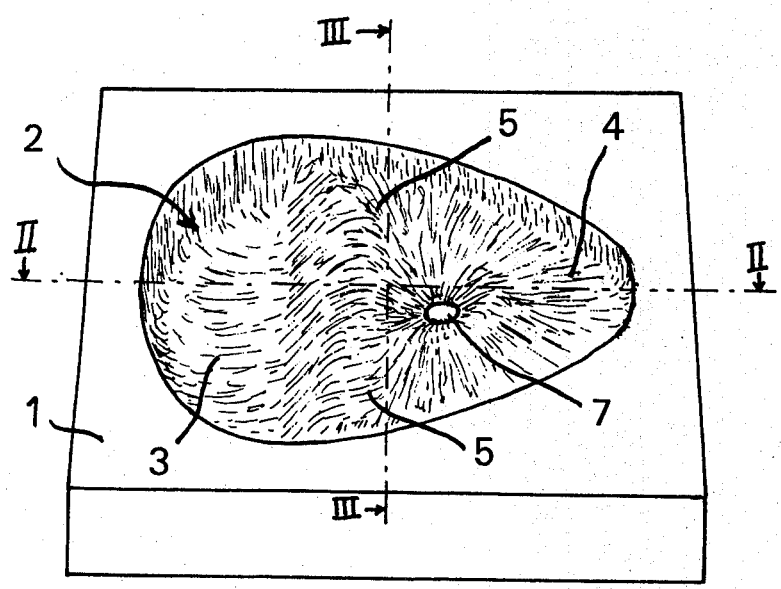
FIG. 1 is a top perspective view of a block of foam material in which a cavity in the configuration of the face of a human head is cut out in accordance with the invention.

FIG. 1 represents a block of foam plastic material in which a cavity 2 is cutout in the shape of a human head and particularly a cavity whose bottom wall is adapted to mate with the face of a person. The cutout block of FIG. 1 is particularly intended for protecting the face of a seriously injured person in the course of transport, lying on his stomach with his head resting on the block of foam material, perfectly held in place with a maximum of precaution, security and comfort.

This cavity 2 is characterized by its relatively complicated configuration since the bottom has several different levels, bosses and depressions although being connected by smooth curves with the sidewalls of the cavity so as to intimately mate with the contours of the human face.

Thus, we note basically three different main levels (FIGS. 1-3) viz., a very slightly concave bottom wall 3 corresponding to the forehead, a part-circular raised bottom 4 plateau approximately corresponding to the chin, and two inclined convex connecting planes 5 at the height of the cheek bones.

Between areas 4 and 5 is a depression 6 for the nose which communicates through a passageway 7 to the opposite side of the block 1 to facilitate the patient's breathing. As for the sidewalls of the cavity 2 they are nearly vertical of slightly inclined in the vicinity of the open end of the cavity. Such a configuration of varied contour comprising hollows, bosses and intermediate flat or inclined planes is impossible to obtain with present-day techniques for cutting out blocks of foam materials, namely those set forth hereinabove.

The object of the present invention is precisely to provide a method and device for producing such configurations.

Figure 6:
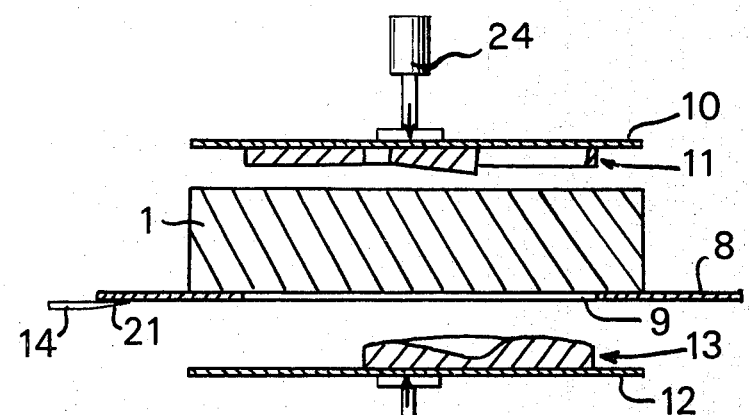
FIG. 6 schematically illustrates a vertical longitudinal sectional view of a device embodying the invention adapted to cutout a block of foam material shown in FIG. 1.
Figure 7:
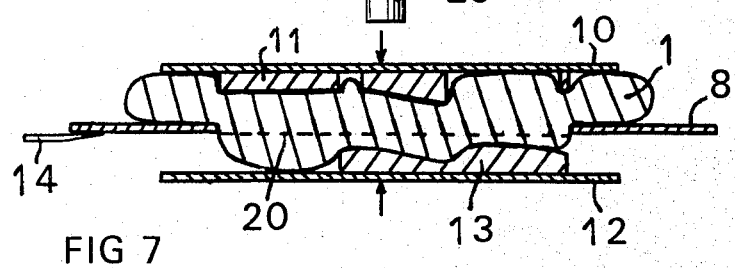
FIG. 7 illustrates the respective positions of the first and second presser plates with respect to the die of the device at the moment the compressed block of foam material is cut.
Figure 4:
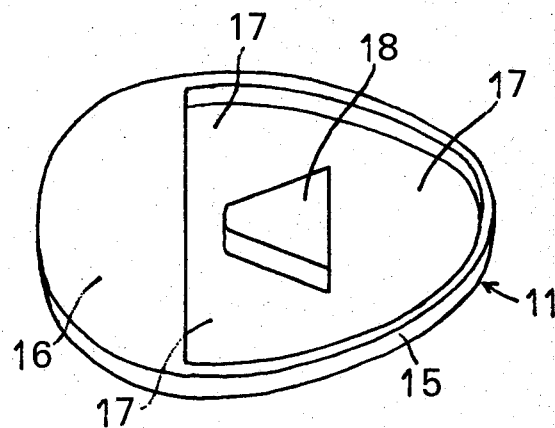
FIGS. 4 and 5 schematically represent a form member and its associated back form member for producing the cavity in the block of foam material shown in FIG. 1.
Figure 5:
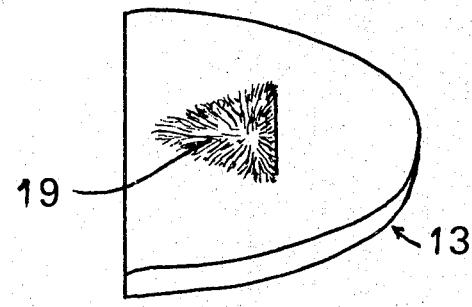

FIGS. 4 and 5 illustrate embodiments of a form member and an associated back form member for producing the configuration of the block of foam material shown in FIG. 1, and FIGS. 6 and 7 schematically show the operation of a device for carrying out the method according to the invention.

The device schematically illustrated in FIG. 6 comprises a fixed die 8 comprising a rigid plate having an aperture 9 the contour of which roughly corresponds to the oval outline of a human face and which is the contour found along the edge of the open end of the cavity 2 in the block of foam material.

Above the horizontal die 8 is disposed a first or upper presser plate 10 to the underside of which is removably and adjustably secured a form member 11 such as shown in FIG. 4.

The first or upper plate 10 is vertically movable and actuated for this purpose as is conventional by means of a jack 24 or other force-applying means (not shown).

The block 1 of foam material to be cut out is placed on the die 8 between the die and the upper plate 10.

Below the die 8 is disposed a second or lower plate 12 to the upperside of which is removably and adjustably secured a back or counter form member 13 such as shown in FIG. 5. The second lower plate 12 is vertically movable towards the fixed die 8 and is operated similarly to first or upper plate 10 for example, by means of a jack 25.

Figure 2:
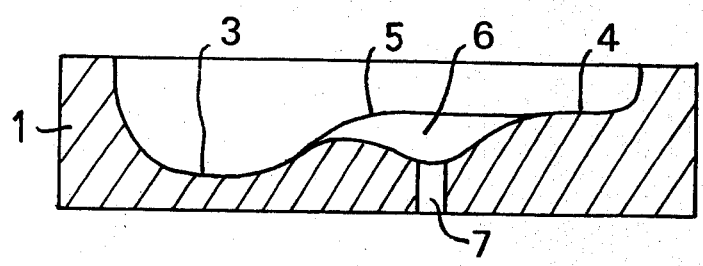
FIG. 2 is a vertical sectional view of the block of foam material taken along line II—II in FIG. 1.
Figure 3:
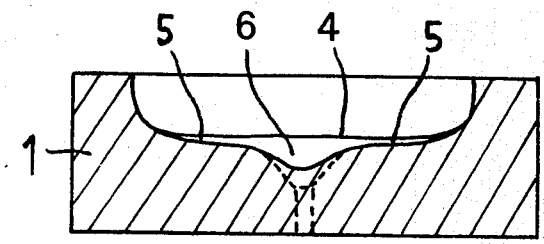
FIG. 3 is a vertical sectional view taken along line III—III in FIG. 1.

The form member and the back form member of FIGS. 4 and 5 of course have their configurations determined for producing the particular configuration of the cavity 2 in FIGS. 1 to 3. The form member 11 comprises a continuous flange 15 of variable height, a solid portion 16 corresponding to the forehead, hollow portion 17 corresponding to the chin and the cheek bones and a protruding island 18 for the nose.

The back form member 13 extends in line with the part of the face substantially below the brow and comprises a solid portion corresponding to the rest of the face of variable thickness and provided in its central area with a hollow 19 for the nose.

The dimensions, shapes, curves and arrangement of its three-dimensional element and surface of the form member and back form member are determined by trial and error as a function of the desired resulting configuration and by a shaping as desired the form member and the back form member which advantageously made of wood are easily worked, adapted and refined with a view to achieving the best results.

By compressing the block 1 of foam material between the first or upper plate 10 and the die 8 part of the foam material in line with the aperture 9 in the dis swells or extrudes downgardly as illustrated, this part is in turn compressed by the second or lower plate 12 which is displaced upwards to the die 8.

The combined action of the form member 11 and the back form member 13 produces in the body of the foam material local internal pressures which vary throughout, depending on the configuration of the form member and the back form member whereby once the block of foam material is compressed as represented in FIG. 7 the cutting blade 14 is displaced flush with the surface of the die along a path indicated by dotted lined 20 and then the plates 10 and 12 return to their position in FIG. 6, the lower face of the block 1 of foam material is as shown in FIG. 1.

The hole 7 is preferably cut either before or after the above described operation although it may be carried out during this operation by adapting the configuration of the form member and back form member accordingly.

Obviously, by adapting the configurations of the form member and the back form member one or more cavities of any configuration whatsoever may be formed in a given block of foam material depending on the desired application.

The block 1 of foam material is formed of polyether, polyester, polyurethane or a plyurethane agglomerate foam or the like which are suitable to this type of work.

The displacement of the cutting blade 14 is relative to the die 8 in the sense that the die is stationary and the cutting blade is movable or vice versa.

Advantageously the cutting blade 14 is a band saw blade whose straight cutting edge 21 is beveled and extends in a straight line and has no teeth which facilitates cutting the material while avoiding tears during penetration into the block of foam material.

The pressures applied to the plates 10 and 12 are independent of each other and may vary depending on the density of the foam to be cut.

Figure 8:
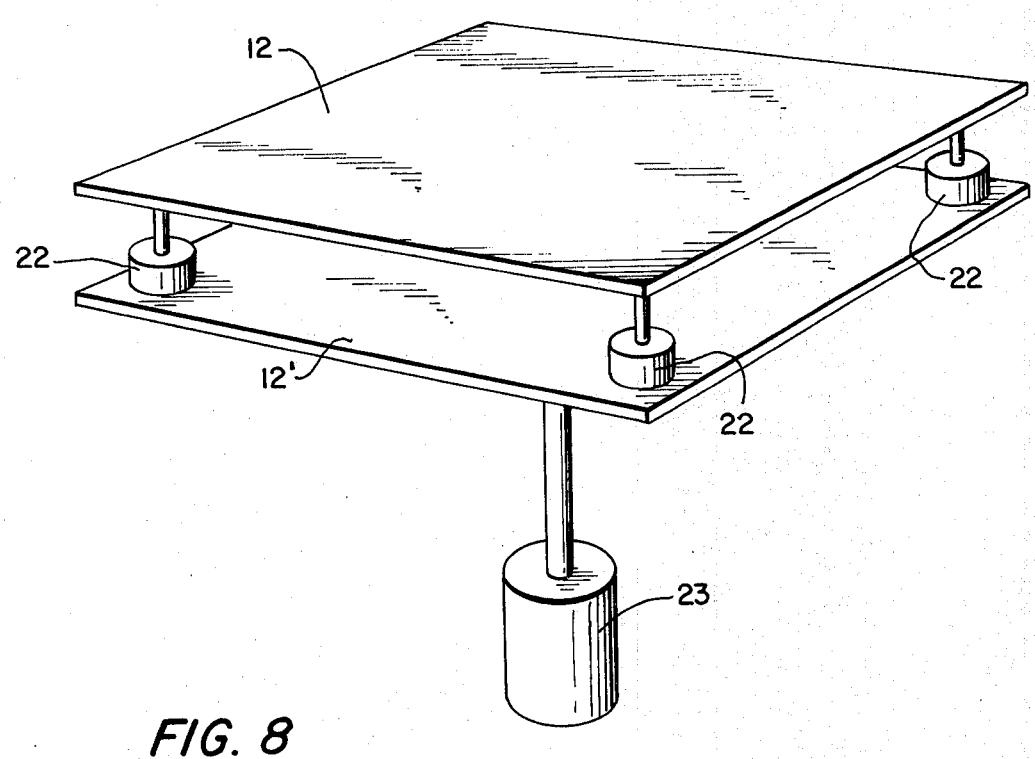
FIG. 8 illustrates jacks for adjusting the pitch of the presser plate and relative position of the plate with respect to the block of foam material.

Furthermore, in order to enlarge the possibilities of cutting out cavities and facilitating the adjustments according to the cutouts to be produced the incline of the second or lower plate 12 is adjustable in relation to the plane of the die 8 in all respects by means of a system of four jacks 22 as shown in FIG. 8 disposed at the for corners of the plate 12 permitting manual adjustment of the initial distance between each of the four corners of the plate in relation to the die prior to the translatory displacement of the plate toward the die by means of jack 23.

Such an arrangement enables certain effects to be obtained or accentuated in the configuration of the resulting cavity.

The mechanisms for controlling and actuating the displacement and the positioning of the first and second plates and the cutting blade is entirely conventional and known to those skilled in the art and therefore need not be described in detail or illustrated.

Finally, the invention is not limited to the illustrated embodiment described above and shown in the accompanying drawings but on the contrary includes all variations and modifications without departing from the scope of the appended claims.

Thus, in particular, the cooperation of the form member and the back form member permit, according to the invention angles to be obtained, namely at the bottom of the cavity which are virtually right angles or acute angles which are impossible to produce with conventionel methods of cutting out pieces of plastic foam material.

Moreover, the method and device according to the invention permit relief shapes as well as hollow shapes since the cutting operation gives two strictly complementary shapes, a hollow one and a relief one which fit in each other.

What is claimed is:

1. A method for cutting out pieces of plastic foam material into desired shapes, the pieces having a cavity with a bottom wall at different levels, said method comprising the steps of:
    compressing a block of foam material between a first plate and a die having an aperture of suitable contour;
    interposing between the first plate and the die a relief form member generally corresponding in shape to the cavity to be formed in resultant piece of foam material;
    applying a back relief form member against part of the block of foam material caused to protrude through the (aperture in) die, the back relief form member having different levels corresponding to the different levels of the bottom wall of the cavity;
    displacing a cutting blade relative to the die between the die and the back form member through the protruding part of the compressed block; and
    relieving the pressure applied to the block of foam material to separate and remove the pieces of the block of foam material thus cut.

2. The method according to claim 1, wherein the back form member is applied with predetermined adjustable pressure.

3. The method according to claim 1 or 2, further comprising inclining the second plate at a desired angle relative to the plane of the die compression of the block of foam material and prior to displacing the cutting blade.

4. The method according to claim 1 or 2, further comprising inclining the second plate at a desired angle relative to the plane of the die before compressing the block of foam material and prior to displacing the cutting blade.

5. A device for cutting out pieces of desired configuration from a block of foam material comprising:
    a plane rigid die having at least one aperture of desired contour;
    a first plate disposed to one side of said die;
    means for displacing said first plate towards said die for compressing a block of foam material therebetween, thereby causing part of the block of foam material to protrude through said aperture;
    a second plate disposed to the other side of said die remote from said first plate;
    means for displacing said second plate towards said die for compressing the portion of the block of foam material protruding through said aperture in said die;
    a cutting blade displaceable relative to said die between said die and said second plate for cutting the block of foam material;
    a form member of suitable configuration for the cavity to be cut out mounted on the side of said first plate facing said die; and
    a back form member mounted on the side of said second plate facing said die.

6. The device according to claim 5, wherein said form member has at least one relief portion.

7. The device according to claim 5 or 6, wherein said form member has at least one hollow portion.

8. The device according to claim 5, wherein said back form member has at least one relief portion.

9. The device according to claim 5 or 6, wherein said back form member has at least one hollow portion.

10. The device according to claim 5, comprising means for selectively adjusting the angle of inclination of said second plate relative to the plate of said die.

11. The device according to claim 10, wherein said adjustement means comprise four jacks disposed at four corners of said second plate for independent adjustment of the distances of the corners of said second plate from said die.

12. The device according to claim 5, wherein said cutting blade comprises a band saw blade with a beveled straight cutting edge.

* * * * *